United States Patent [19]

Cluba

[11] Patent Number: 4,730,867
[45] Date of Patent: Mar. 15, 1988

[54] VEHICLE ARM REST

[76] Inventor: Frank M. Cluba, 605 215 Chestnut Oak Cir., Altamonte Springs, Fla. 32701

[21] Appl. No.: 911,116

[22] Filed: Sep. 24, 1986

[51] Int. Cl.⁴ ............................................. A47B 97/00
[52] U.S. Cl. .................................... 296/153; 248/118; 297/411; 428/83; 428/122
[58] Field of Search ........................ 428/83, 122, 174; 297/413, 411; 248/118; 296/153

[56] References Cited

U.S. PATENT DOCUMENTS

| | | | |
|---|---|---|---|
| 176,613 | 6/1876 | Elbert | 428/122 X |
| 1,650,385 | 11/1927 | Payton | 297/413 X |
| 1,695,549 | 12/1928 | Hausler | 297/413 |
| 1,706,634 | 3/1929 | Seils | 248/118 X |
| 1,715,862 | 6/1929 | Payton | 297/413 |
| 1,756,694 | 4/1930 | Loehr | 296/153 |
| 4,089,497 | 5/1978 | Miller et al. | 297/411 X |
| 4,153,230 | 5/1979 | Giacin | 428/83 X |
| 4,477,507 | 10/1984 | Kunert | 428/122 X |
| 4,520,605 | 6/1985 | Budd | 428/122 X |
| 4,528,706 | 7/1985 | Branker | 5/481 X |
| 4,582,739 | 4/1986 | Givens | 428/83 |

Primary Examiner—Henry F. Epstein
Attorney, Agent, or Firm—Gilden & Israel

[57] ABSTRACT

A lightweight, plastic arm rest for use in a vehicle includes a groove to permit a positioning of the rest over the edge of a vehicle door window. An elongated concave section of the device serves as a rest for the user's arm.

3 Claims, 4 Drawing Figures

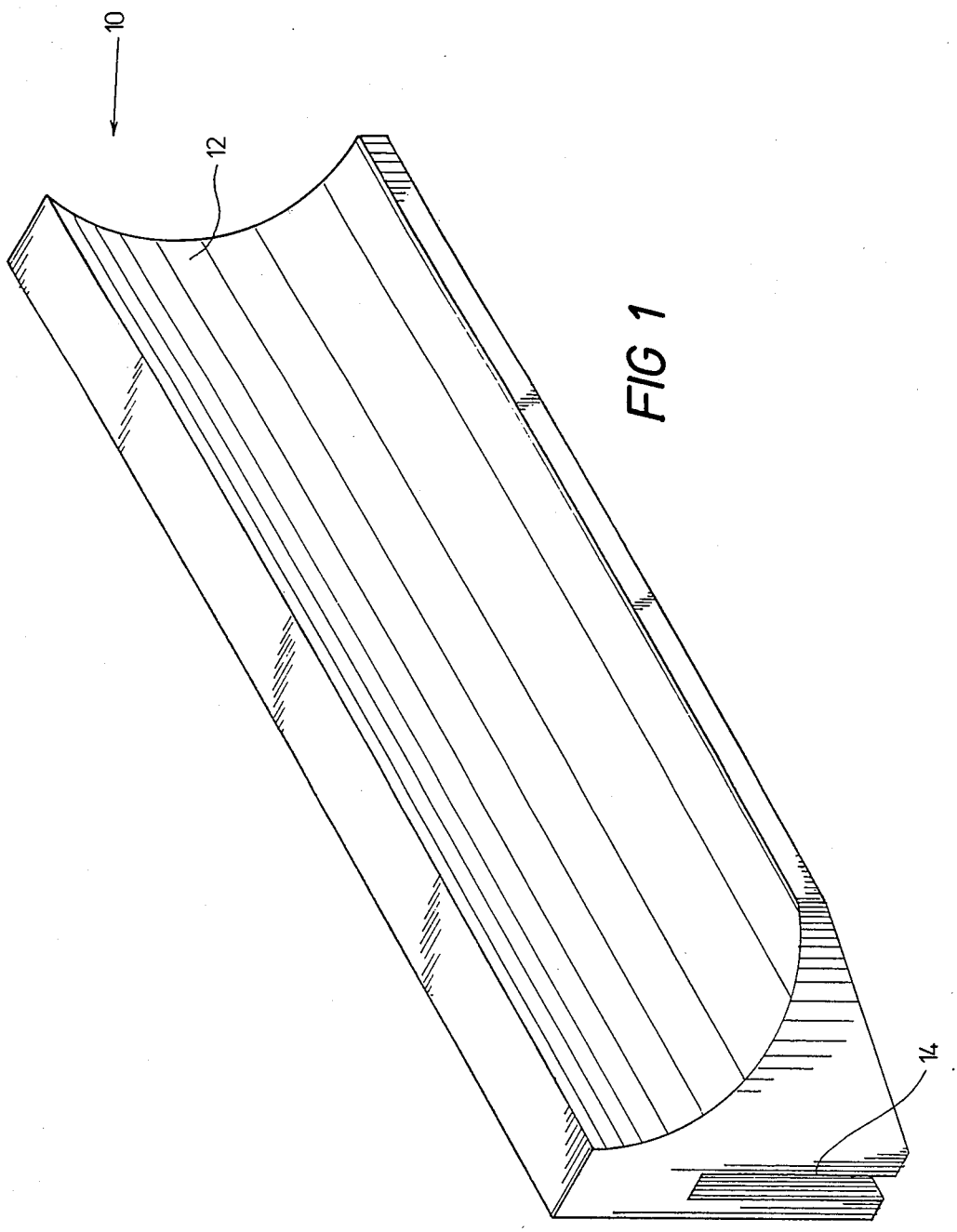

VEHICLE ARM REST

BACKGROUND OF THE INVENTION

1. Field of the Invention

The present invention relates to arm rests, and more particularly pertains to arm rests designed and adapted to provide comfortable support for the arms of drivers and passengers in vehicles.

2. Description of the Prior Art

Numerous patents have been granted on arm rest constructions wherein the same are attachable to vehicle doors, thereby to provide support for the arms of drivers and passengers. Most of these devices are relatively complicated and expensive in construction, and are not capable of being produced economically so as to be commercially feasible.

However, several arm rests have been developed which are relatively simple in design although they have apparently never been commercially developed. For example, U.S. Pat. No. 1,695,549 which issued to J. Hausler on Dec. 18, 1928, discloses an adjustable arm rest for automobiles which essentially comprises a strip of sheet metal that includes a bent portion formed into the shape of a flange. The flange essentially forms a hook which is of a suitable size and shape to fit over the lower molding of a vehicle window. The opposed end of the rest is bent upwardly into a concave shape to form a support for the arm of a person seated in the vehicle. While being functional for its intended use, it can be appreciated that the Hausler arm rest is designed for attachment directly to a door molding so as to be located at a fixed height relative to a vehicle passenger or driver. In this regard, the hook design on the arm rest does not permit its attachment to other components within the vehicle, such as an edge of the vehicle window or the like.

Similarly, U.S. Pat. No. 1,756,694, which issued to H. Loehr on Apr. 29, 1930, addresses the construction of a padded arm rest which is also directly attachable to the vehicle door molding. The arm rest construction shown in this patent is substantially complex and expensive to manufacture, and requires the use of threaded fasteners to effect a desired attachment of the rest to the door molding structure. As such, no provision is made for facilitating adjustable movement of the arm rest in either horizontal or vertical directions.

There has been some recognition of the need for adjustable movement of an arm rest, as evidenced in U.S. Pat. No. 1,706,634, which issued to C. Seils on Mar. 26, 1929. The arm rest shown in this reference is also attachable to the door molding through the use of threaded fasteners, while the arm support portion is mounted on a swivel assembly to facilitate limited adjustable movement. However, no provision is made for substantial vertical or horizontal repositioning to accommodate the desires of a user.

As such, it can be appreciated that there is a continuing need for new and improved arm rests utilizable in vehicles, wherein such arm rests can be adjustably moved to various vertical and horizontal positions to thus accommodate the desires of a user. In this respect, the present invention substantially fulfills this need.

SUMMARY OF THE INVENTION

In view of the foregoing disadvantages inherent in the known types of vehicle arm rests now present in the prior art, the present invention provides an improved vehicle arm rest construction wherein the same can be attached to the edge of an adjustably movable window, thereby to facilitate vertical and horizontal adjustment of the arm rest when the same is attached to such window. As such, the general purpose of the present invention, which will be described subsequently in greater detail, is to provide a new and improved vehicle arm rest which has all the advantages of the prior art vehicle arm rests and none of the disadvantages.

To attain this, the present invention essentially comprises an elongated, molded arm rest of a concave shape with the concave portion serving as a support for the user's arm. A groove is provided along an axial length of the arm rest, with the groove being sized to fit over the edge of an adjustably movable window in a vehicle door. The groove serves as the only attachment means of the arm rest to the window, thereby to facilitate a sliding movement of the arm rest along a horizontal edge of the window, while the window can be raised or lowered to thus adjust the height of the arm rest.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle arm rest which has all the advantages of the prior art vehicle arm rests and none of the disadvantages.

It is another object of the present invention to provide a new and improved vehicle arm rest which may be easily and efficiently manufactured and marketed.

It is a further object of the present invention to provide a new and improved vehicle arm rest which is of a durable and reliable construction.

An even further object of the present invention is to provide a new and improved vehicle arm rest which is susceptible of a low cost of manufacture with regard to both materials and labor, and which accordingly is then susceptible of low prices of sale to the consuming public, thereby making such vehicle arm rest economically available to the buying public.

Still yet another object of the present invention is to provide a new and improved vehicle arm rest which provides in the apparatuses and methods of the prior art some of the advantages thereof, while simultaneously overcoming some of the disadvantages normally associated therewith.

Still another object of the present invention is to provide a new and improved vehicle arm rest which may be easily attached to the edge of an adjustable vehicle window.

Yet another object of the present invention is to provide a new and improved vehicle arm rest which may be adjustably positioned at various heights.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the vehicle arm rest comprising the present invention.

DESCRIPTION OF THE PREFERRED EMBODIMENT

Figure 4:
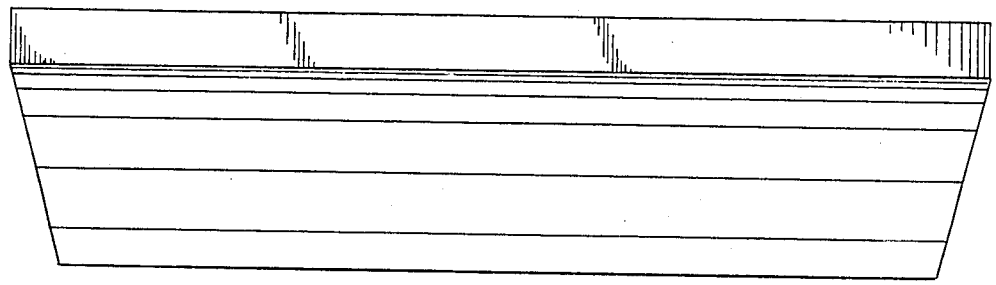
FIG. 4 is a top plan view thereof.
Figure 2:
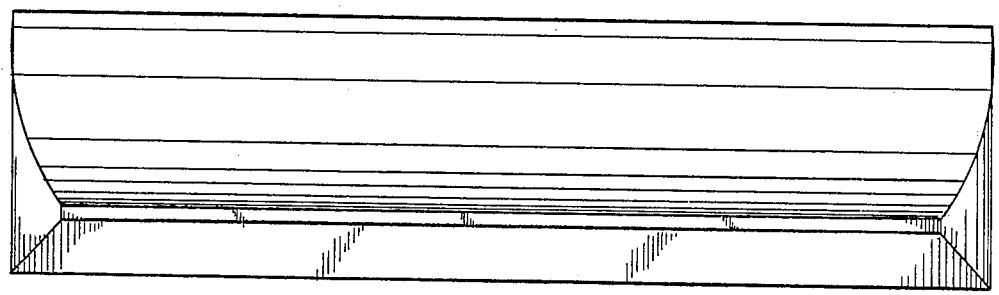
FIG. 2 is a front elevation view thereof.
Figure 3:
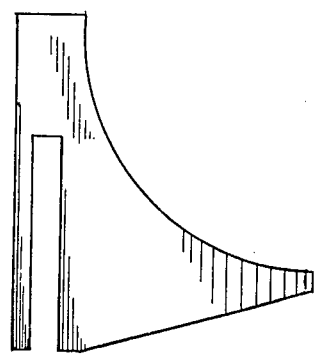
FIG. 3 is an end elevation view thereof.

With reference now to the drawings, and in particular to FIGS. 1-4 thereof, a new and improved vehicle arm rest embodying the principles and concepts of the present invention and generally designated by the reference numeral 10 will be described.

More specifically, it will be noted that the vehicle arm rest 10 is essentially of an integral elongated design. In this regard, the design includes a concavely-shaped surface 12 along an axial length thereof with this surface serving as a support for the user's arm. While illustrated as being of a concave shape, it is to be understood that the surface 12 could be more precisely shaped and designed to accommodate the comfort needs of a user. Accordingly, all conceivable shapes and designs which would enhance user comfort are within the intent and purview of the present invention.

With further reference to the drawings, it will be noted that an opposed side of the arm rest 10 includes a substantially deep groove 14 that extends along the entire axial length of the rest. In this connection, the groove 14 is in parallel alignment with the concave surface 12, thereby to complete the structural design of the invention. The complete arm rest 10 may be constructed of any conceivable material, such as plastic, rubber, or the like, with plastic being the preferred material for constructing the invention.

With respect to the manner of usage of the present invention, it will be appreciated that the arm rest 10 may be directly attached to the edge of an adjustable vehicle window, such as the type which may be rolled up and down in a vehicle door. More particularly, the groove 14 is positionable over the edge of the window, with this groove being sized to provide a good frictional fit with the window edge. Once positioned over the window edge, the window may be raised or lowered as desired so as to position the arm rest 10 at the desired height, while the user may then position his arm along the concave surface 12 to effect a supporting thereof.

With respect to the above description then, it is to realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An arm rest for a vehicle, said arm rest comprising:
 a. body means;
 b. groove integrally formed in said body means, said groove being formed along a complete axial length of said body means, said groove being positionable over an edge of a window in said vehicle; and,
 c. arm support means attached to said body means, said arm support means being integrally formed in said body means, said arm support means having a concave shape, said arm support means extending along a complete axial length of said body means, said arm support means being positioned substantially inwardly of said groove.

2. The arm rest of claim 1, wherein said groove and said arm support means are in parallel alignment.

3. The arm rest of claim 2, wherein said body means is formed from a plastic material.

* * * * *